Patented Oct. 8, 1940

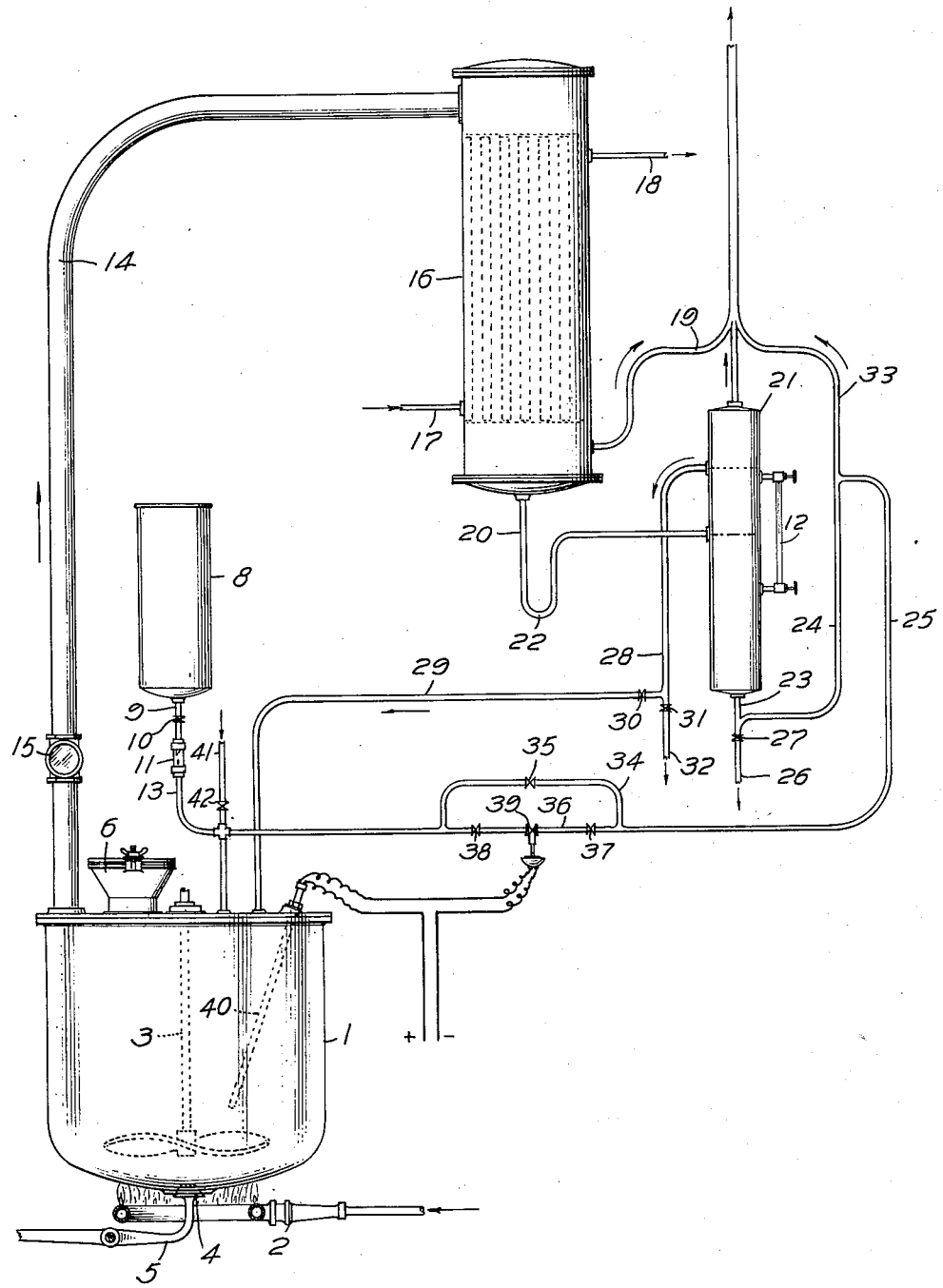

2,217,516

UNITED STATES PATENT OFFICE 2,217,516

PRODUCTION OF ORGANIC COMPOUNDS

Alfred Gordon Houpt, Stamford, Conn., assignor to American Cyanamid Company, New York, N. Y., a corporation of Maine Application February 8, 1939, Serial No. 255,177

13 Claims. (Cl. 260—398)

This invention relates to the conversion of a ricinoleate such as castor oil into other organic compounds including sebacic acid, salts of sebacic acid, capryl alcohol and/or methyl hexyl ketone.

Capryl alcohol and sebacic acid have previously been prepared to some extent from castor oil but attempts on a commercial scale have been generally unsatisfactory because of the many practical difficulties involved. Thus, castor oil has been saponified with caustic and the resulting soap has been subjected to distillation in the presence of caustic and water. However, during the distillation process, great difficulty was experienced because of the excessive foaming of the soap which usually resulted in the soap overflowing from the apparatus or else clogging the system. Another difficulty encountered was the control of the temperature at which the distillation was carried out. If the distillation temperature is not carefully controlled, poor yields may be obtained and furthermore, the undesired foaming is more likely to occur.

One object of this invention is to devise a process for converting ricinoleates into sebacic acid, salts of sebacic acid, capryl alcohol and/or methyl hexyl ketone, which process is economical and practical and which can, therefore, be used commercially. Another object of this invention is to control the rate of reaction in the process and to control the temperature at which the reaction is carried out in order to overcome the difficulties of the prior art.

These and other objects are attained by adding the ricinoleate slowly to an aqueous composition including caustic alkali to produce a reaction mixture while heating the reaction mixture sufficiently to maintain a suitable reaction temperature. The reaction temperature should preferably be kept substantially constant. Salts of ricinoleic acid or substances which upon saponification yield salts of ricinoleic acid are suitable for reaction according to my invention. Among these compounds are ricinoleic acid (hydrogen ricinoleate, triricinolein (glycerol ricinoleate, the principal ingredient of castor oil), ricinoleic acid esters of other alcohols, and ricinoleic acid amides. All of these compounds as well as the salts of ricinoleic acid contain the ricinoleic acid radical $C_{17}H_{32}(OH)\overset{|}{C}=O$. For convenience, the term "ricinoleate" will be used to designate all of these substances as well as the raw materials such as castor oil which contain these substances. While the ricinoleates are usually derived from castor oil, other sources could also be used such as ivory wood seed oil, grape seed oil, quince oil, etc.

Although the process may be conducted in any suitable apparatus, either as a continuous or batch process, the apparatus shown in the accompanying drawing has been found to be particularly suitable. The drawing shows somewhat diagrammatically the apparatus, partly in section and partly in elevation.

A suitable reaction chamber such as the kettle 1 is heated by a burner 2. The kettle is fitted with a suitable stirrer 3 and contains a discharge outlet 4 with a drop out valve 5. The top of the kettle 1 contains a charging port 6.

A supply tank 8 for the ricinoleate has an outlet conduit 9 which is provided with a suitable valve 10 for controlling the flow of the ricinoleate. Conduit 9 connects with conduit 13 through a sight glass 11 and conduit 13 is also connected to the kettle 1.

The top of the kettle 1 also has an outlet conduit 14 attached thereto and this conduit may contain a sight glass 15. The conduit 14 is connected to a condenser 16. Cooling water may be circulated through the condenser by means of inlet 17 and outlet 18. The condenser 16 also has a vent 19 and a condensate outlet 20 which feeds into a separate 21 through a goose-neck 22. The separator 21 contains an outlet 23 at the bottom which connects with a standpipe formed by conduits 24 and 25. The outlet 23 from the separator 21 also contains a suitable draw-off line 26 provided with valve 27. The separator may be provided with a sight glass 12 and has a draw-off pipe 28 near the top at a point somewhat higher than the top of the standpipe.

The draw-off pipe 28 connects with conduit 29 which connects with kettle 1 and is provided with a valve 30. Conduit 28 is provided with valve 31 located at a point beyond the connection of conduit 30. Conduit 28 connects with conduit 32 and the latter connects with a suitable storage, or alternatively, further processing apparatus (not shown). A vent 33 is connected to the top of the separator 21 and to the top of the standpipe formed by conduits 24 and 25, and this vent may be connected with vent 19. The conduit 25 connects with by-pass conduit 34 which contains a valve 35. Conduit 25 also connects with conduit 36 containing valves 37 and 38 and an electrically actuated valve 39 located between valves 37 and 38. Conduit 36 and conduit 34 are connected to the kettle 1. The electrically actuated valve 39 is operated by any suitable well-known means and its operation is controlled by thermostatic element 40. Water may be supplied to the kettle 1 directly through a conduit 41 which is provided with a valve 42.

In operation, a mixture of caustic and water is charged into the kettle 1 and heated to a suitable reaction temperature. The agitator 3 is placed in operation, the valve 35 is opened slightly, and the thermostatic control and valve 39 are placed in operation. The castor oil from tank 8 is then fed slowly into the kettle 1 at such a rate that no foaming is visible in the sight glass 15. The volatile reaction products distill off along with some water and pass up through conduit 14, into the condenser 16. The condensate from the condenser 16 flows through conduit 20 into the separator 21 where it separates into an essentially aqueous fraction and an essentially non-aqueous fraction. The essentially aqueous fraction of the condensate is usually returned to the kettle through the conduit system formed by elements 23, 24, 25, 34 and 36. A continuous stream of the essentially aqueous fraction of the condensate is permitted to flow back into the kettle 1 through by-pass conduit 34 and its rate is adjusted by means of the valve 35. A part of the essentially aqueous fraction of the condensate is permitted to flow through the valve 39 whenever the temperature in the kettle rises above the desired temperature for which the thermostatic control has been set. The essentially non-aqueous fraction of the condensate is usually drawn off through conduit 28 and its flow into conduit 32 is controlled by valve 31. The non-aqueous fraction of the condensate flows through conduit 32 to a suitable storage or to other processing apparatus (not shown). Alternatively, at least part of the essentially non-aqueous fraction of the condensate may be permitted to flow back to the kettle 1 through conduit 29 by opening valve 30.

The hydrogen which may be formed during the reaction escapes through the vent 19.

The following is a description of one method of carrying out my process to convert a ricinoleate into sebacic acid, capryl alcohol and/or methyl hexyl ketone. This example is merely illustrative of my process, it being understood that my invention is not restricted to the specific details and procedure set forth. The process may be conducted in the apparatus and in the manner described above, but any other suitable apparatus may be substituted.

5000 parts by weight of water, 15,000 parts by weight of granular caustic soda, and 2000 parts by weight of 600-W lubricating oil (as an antifoam) are charged into the kettle 1 in that order. The 600-W oil is one having an initial boiling point at atmospheric pressure of about 700°–750° F., a flash point of about 540° F., and specific gravity about 25.7. The charge is heated to about 245° C. and 15,000 parts by weight of castor oil are gradually added over a period of about one and one-half to two hours. The major portion of the distillate comprises capryl alcohol and water while the remainder is composed of methyl hexyl ketone and small proportions of various impurities. The capryl alcohol and other water insoluble compounds are separated from the water and the latter is returned at such a rate that the distillation temperature of the reaction mixture will remain substantially constant at about 245° C. The distillation at 245° C. is continued for about one to one and one-half hours after all of the castor oil has been added.

The residue of the reaction mixture which remains in the kettle after the distillation is complete is discharged and is added slowly to about 110,000 parts by weight of warm water (about 60° to 70° C.) with strong agitation. The agitation is continued until the material is uniformly dispersed and then sulfuric acid (preferably 50% concentration) is added slowly with good agitation until the pH is between about 5.5 and 6.0. This mixture is separated into an aqueous fraction and an oily fraction. This may be done conveniently by allowing the mixture to stand at 75° to 90° C. for about one to two hours. The aqueous fraction is treated with about 2500 parts by weight of kieselguhr and about 500 parts by weight of decolorizing carbon such as "Darco" at about 60° to 75° C. for about a half hour with good agitation. It is filtered while still hot (e. g. about 60° to 65° C.) and the filtrate is heated to about 90° to 95° C. Sulfuric acid (preferably 50% concentration) is added slowly with agitation until the pH is between about 1.5 to 2.0. The sebacic acid will now be partially precipitated as an extremely fine, snow-white precipitate. This suspension is cooled to about 15° to 20° C. with constant agitation and the sebacic acid is separated, e. g. by filtration. The sebacic acid is washed thoroughly with water at about 15°–20° C. until the wash water gives no test for sulfate ions. It is then dried at about 75° to 90° C., preferably by spreading on trays in an oven. The yield is about 40% of the weight of the castor oil used. The product is pure white, has a melting point of about 129° to 132° C., and titration indicates that it is between about 98% and 99% pure sebacic acid.

The filtrate from the last filtration operation contains between about 16% and 19% of sodium sulfate and, therefore, a high grade Glauber's salt may be recovered as a by-product in any suitable and well-known manner.

Any other suitable mineral acid may be substituted for the sulfuric acid, e. g. hydrochloric acid, nitric acid, etc.

The water insoluble fraction of the distillate which is separated during the reaction from the aqueous portion of the condensate is preferably redistilled to yield about 20–25% by weight of the castor oil used as capryl alcohol The redistilled capryl alcohol is a water-white product with a boiling range of about 175° to 178° C.

If it be desirable to recover the methyl hexyl ketone which may be formed during the process, the water insoluble fraction of the condensate should be treated with sodium bisulfite and the resulting insoluble complex of the ketone and the sodium bisulfite is washed free from the capryl alcohol with a low boiling solvent, e. g. methanol, ethanol, etc. The insoluble complex is then steam distilled in order to recover the ketone leaving the bisulfite in the still. If the bisulfite is not to be recovered, the insoluble complex may be treated with either an acid or a base in order to speed up the reconversion to the ketone upon steam distillation. The ketone has a boiling range between about 172.5° C. and 173.5° C.

When temperatures somewhat lower than 235° C. are used, a mixture of sebacic acid and omega-hydroxydecanoic acid may be produced. In this event, the mixed acids are recovered from the reaction mixture in the same way as described above for the recovery of the sebacic acid and the sebacic acid may be separated from the omega-hydroxydecanoic acid by extracting the former from the mixed acids with hot water. Another way of effecting the separation is by separating the two acid salts by precipitating the di-alkali salts of sebacic acid from alcohol in which the omega-hydroxydecanoic acid salts are soluble.

The preferred range of reaction temperature in order to obtain good yields of sebacic acid is between about 235° and 275° C. Higher temperatures than 275° C., up to the carbonization temperature e. g. up to 350° to 400° C., may also be used but usually it is more convenient to operate the process within the preferred range of temperature. Lower temperatures than 235° C. may be used e. g. 220° C. or even lower, but with the lower reaction temperatures lower yields of sebacic acid will be obtained than with the higher reaction temperatures.

The caustic alkali which is used may be either sodium hydroxide, potassium hydroxide or mixtures of the two. By the use of mixtures compositions are obtained which have lower softening points and/or are more fluid than compositions containing sodium hydroxide alone.

The foaming which was experienced previously in attempts to make sebacic acid from ricinoleates such as castor oil is chiefly overcome by adding the ricinoleate slowly to a caustic composition. In this way only a small quantity of unreacted ricinoleate is present in the reaction mixture at any particular time. Virtually, as rapidly as the soap is formed, it is decomposed and the capryl alcohol and other volatile matter is distilled off. Hydrogen which may be formed in the process easily comes off almost as quickly as evolved without being trapped in the reaction mixture to any great extent. In this way the objectionable foaming is avoided. The reaction will proceed at a suitable velocity if the flow of castor oil or other ricinoleate be adjusted at the highest rate at which no objectionable foaming occurs. In order to minimize foaming, it is also advisable to keep the temperature substantially constant and in this way to maintain a relatively uniform rate of reaction. If the reaction temperature drops to any great extent, the concentration of unreacted ricinoleate may rise rapidly and during the subsequent rise of temperature, the rate of reaction will be so rapid that excessive foaming will occur.

A relatively high boiling hydrocarbon oil which contains substantially no low boiling fractions may be added to the reaction mixture in order to assist further in preventing excessive foaming. This is merely optional since the foaming may be adequately controlled by suitably adjusting the inflow of ricinoleate and by maintaining the reaction temperature substantially constant at the desired point.

Within the preferred range of temperature for producing sebacic acid, capryl alcohol will normally be produced with little or no methyl hexyl ketone. It it be desirable to produce methyl hexyl ketone instead of capryl alcohol, the process preferably should be modified slightly. The volatile reaction products which are distilled off during the reaction are, after condensation, returned to the reaction mixture and in this way, capryl alcohol may be largely converted to methyl hexyl ketone. In general, it has been found that the ratio of methyl hexyl ketone to capryl alcohol increases with an increase of the time of contact of the volatile reaction products with the caustic.

In order to improve the yield of sebacic acid or one of its salts, it may be desirable to introduce oxygen or air into the reaction chamber, especially if reaction temperatures near the lower part of the range be used.

Catalysts may be used in carrying out my process, but it has generally been found that good results may be obtained without any catalyst. However, if good yields of capryl alcohol be desired, it may be advisable to add a small quantity of a calcium salt to act as a catalyst.

While it is generally more convenient to operate at atmospheric pressure, it will be apparent that the process can be carried out at either reduced or increased pressures.

The following reactions are believed to take place in this process, but it is to be understood that the invention is not restricted to this suggested explanation.

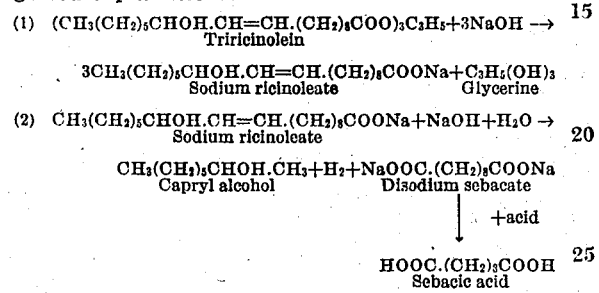

Obviously, many modifications of the process as described above are possible without departing from the spirit and scope of the invention as defined in the appended claims.

I claim:

1. In a process for converting a ricinoleate into other organic compounds including a salt of sebacic acid, the step which comprises adding a ricinoleate slowly to an aqueous composition including an effective amount of caustic alkali, which composition is heated at a substantially constant reaction temperature.

2. In a process for converting a ricinoleate into other organic compounds including a salt of sebacic acid, the step which comprises adding a ricinoleate slowly to an aqueous composition including an effective amount of caustic alkali at a constant temperature between 235° and 275° C.

3. In a process for converting a ricinoleate into other organic compounds including a salt of sebacic acid, the steps which comprise adding a ricinoleate slowly to an aqueous composition including an effective amount of caustic alkali to produce a reaction mixture, the reaction mixture being heated at 235°–275° C., removing at least one of the reaction products, and adding water to the reaction mixture to maintain the boiling point thereof substantially constant at a temperature between 235° and 275° C.

4. In a process for converting castor oil into other organic compounds including a salt of sebacic acid, the steps which comprise heating an aqueous composition including an effective amount of caustic alkali at a substantially constant reaction temperature, and adding castor oil slowly to the composition.

5. In a process for converting castor oil into other organic compounds including a salt of sebacic acid, the steps which comprise heating an aqueous composition including an effective amount of caustic alkali at a constant temperature between 235° and 275° C., and adding the castor oil slowly to the composition.

6. In a process for converting castor oil into other organic compounds including a salt of sebacic acid, the steps which comprise heating an aqueous composition including an effective amount of caustic alkali at 235°–275° C., adding castor oil slowly to the composition to produce a reaction mixture, and removing at least one of the reaction products, the boiling point of the reaction mixture being maintained substantially constant at a temperature between 235° and 275° C.

7. A process for converting a ricinoleate into other organic compounds including sebacic acid, which comprises heating an aqueous composition including an effective amount of caustic alkali at 235°-275° C., adding a ricinoleate slowly to the composition to produce a reaction mixture, removing at least one of the reaction products, adding water to the reaction mixture to maintain the boiling point thereof substantially constant at a temperature between 235° and 275° C., and recovering sebacic acid from the reaction mixture.

8. In a process for converting castor oil into other organic compounds including a salt of sebacic acid, the steps which comprise adding castor oil slowly to an aqueous composition including an effective amount of caustic alkali to produce a reaction mixture, heating the reaction mixture at about 245° C., and adding water to the reaction mixture to maintain the boiling point thereof substantially constant at about 245° C.

9. In a process for converting castor oil into other organic compounds including a salt of sebacic acid, the steps which comprise heating an aqueous composition including an effective amount of caustic alkali at about 245° C., adding castor oil slowly to the composition to produce a reaction mixture, removing water and at least one of the reaction products by distillation, and adding water to the reaction mixture to maintain the boiling point thereof substantially constant at about 245° C.

10. A process as in claim 9 wherein the water which is added to the reaction mixture is separated from the reaction product which is removed by distillation.

11. A process which comprises heating an aqueous composition including an effective amount of caustic alkali to maintain a temperature of about 245° C., adding castor oil slowly to the composition to produce a reaction mixture, removing volatile reaction products, adding water to the reaction mixture to maintain the boiling point thereof substantially constant at about 245° C., and separating capryl alcohol from said volatile reaction products.

12. A process for producing sebacic acid and capryl alcohol which comprises adding castor oil slowly to an aqueous composition including an effective amount of caustic alkali to produce a reaction mixture, heating the reaction mixture at about 245° C., removing and condensing capryl alcohol and water from said reaction mixture, separating the condensate into an essentially capryl alcohol fraction and an essentially aqueous fraction, returning at least part of the aqueous fraction to the reaction mixture to maintain the boiling point thereof substantially constant at about 245° C. and recovering sebacic acid from the reaction mixture.

13. A process of producing organic compounds including sebacic acid which comprises heating an aqueous composition including an effective amount of caustic alkali to maintain a temperature of about 245° C., adding castor oil slowly to the composition to produce a reaction mixture, removing the volatile portion of the reaction products, adding water to the reaction mixture to maintain the boiling point thereof substantially constant at about 245° C., mixing the non-volatile residue of the reaction mixture with a relatively large volume of warm water, agitating the mixture with a mineral acid until the pH is between about 5.5 and 6.0, allowing said mixture to separate into two layers, removing the essentially aqueous layer, mixing said layer with a filter aid, filtering said aqueous layer while warm, adding sufficient mineral acid with agitation until the pH is between about 1.5 and 2.0, cooling the filtrate, thereby precipitating sebacic acid, and separating the sebacic acid from the filtrate.

ALFRED GORDON HOUPT.